April 15, 1958 P. H. MARSELL 2,830,470
COMBINED TORQUE CHANGER AND VARIABLE SPEED TRANSMISSION
Filed Aug. 24, 1956 2 Sheets-Sheet 1
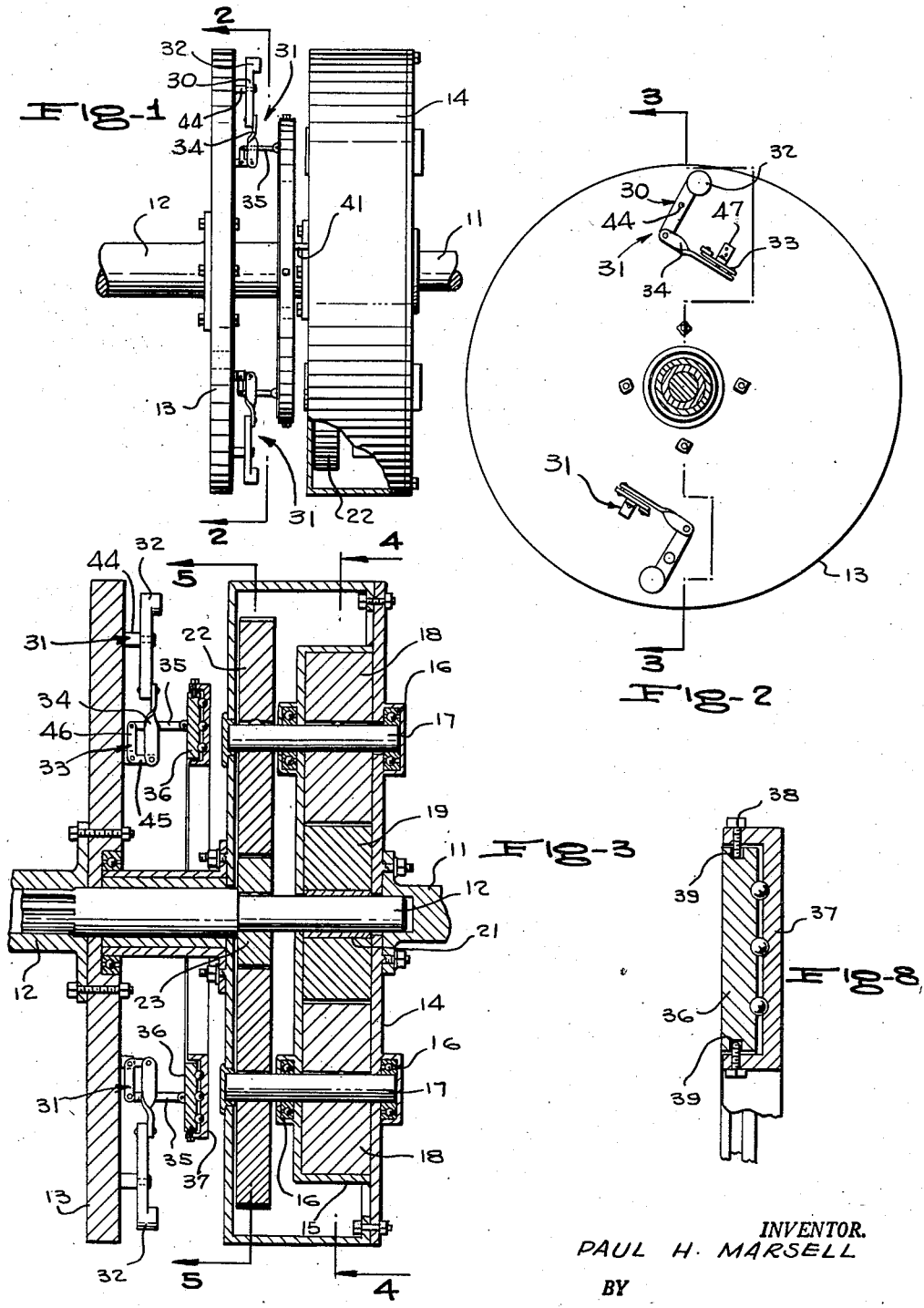
INVENTOR.
PAUL H. MARSELL
BY
McMorrow, Berman & Davidson
ATTORNEYS

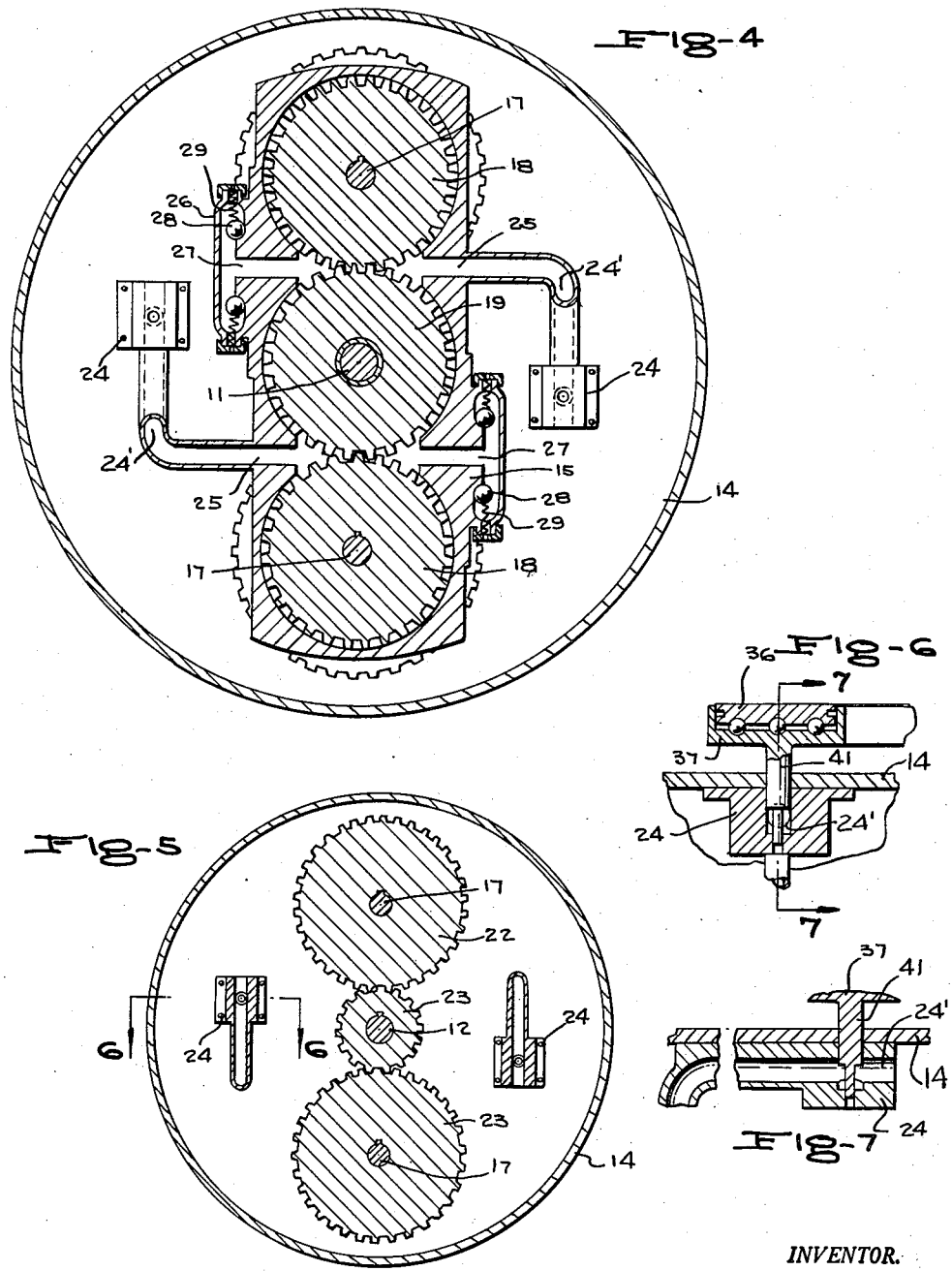

United States Patent Office 2,830,470
Patented Apr. 15, 1958

2,830,470

COMBINED TORQUE CHANGER AND VARIABLE SPEED TRANSMISSION

Paul H. Marsell, Cortez, Colo.

Application August 24, 1956, Serial No. 606,078

2 Claims. (Cl. 74—752)

The present invention relates to transmission devices.

The principal object of the present invention is to provide a new and improved combined torque changer and variable speed transmission of the fluid type.

Another object of the present invention is to provide a lightweight and compact torque changer and variable speed transmission for automotive vehicles which has a high starting torque for starting a load from a condition of rest and a direct drive wherein the driven shaft of the transmission rotates at the same speed as the drive shaft.

A further object of the invention is to provide a device for using centrifugal force to control a valve in a closed hydraulic system.

A still further object of the invention is to provide a variable speed transmission of the fluid type which is especially adapted for use in motor vehicles and one which involves using only a few parts and may be constructed with a minimum of weight.

Yet another object of the present invention is to provide a fluid drive transmission for a vehicle which will not operate in reverse to permit coasting of the vehicle at a speed greater than engine speed.

These objects and advantages of the present invention will be fully apparent upon consideration of the drawings and from the following description.

In the drawings in which like numerals indicate like parts throughout the several views:

Figure 1 is a side view in elevation of the present invention;

Figure 2 is an end view on line 2—2 of Figure 1;

Figure 3 is a cross sectional view on line 3—3 of Figure 2;

Figure 4 is an end view in cross section on line 4—4 of Figure 3;

Figure 5 is an end view in somewhat reduced cross sectional view on line 5—5 of Figure 3;

Figure 6 is a detailed view in cross section of the valve structure in the present invention;

Figure 7 is a cross-sectional view on line 7—7 of Figure 6; and

Figure 8 is a detailed view in cross section greatly enlarged of a portion of the invention as seen in Figure 3.

Referring to the drawing in greater detail, the invention is seen to consist of the driven shaft 11 and a drive shaft 12, the latter being connected to a fly wheel 13.

Secured to the driven shaft 11 is a cylindrically shaped housing 14. A pump casing 15 is within the housing 14 and the bearing blocks 16, one of which is in the housing wall and the other is in the pump casing, support shafts 17, on the end of which are keyed the oil pump gears 18. The oil gears 18 mesh with a common gear 19 rotating freely on a sleeve bearing 21 which is positioned on the end of the drive shaft 12.

The other ends of the shafts 17 are journalled in the housing 14 and are keyed to gears 22, in a planetary gear train, which are in mesh with a sun gear 23, the latter being secured to a drive shaft 12.

Referring to Figure 4, within the housing 14 but exterior of the pump casing 15 are a pair of valve blocks 24. Each of the valve blocks 24 is connected by means of a conduit 24' to an outlet port 25 provided in the pump casing 15. An outlet valve means or valve 41 in each of the valve blocks 24 controls the flow of fluid through the conduit 24' out of their respective outlet ports 25 into the housing 14. Check valves 26 on the inlet ports 27, having ball valves 28 biased to an open position by springs 29 permit fluid to re-enter the casing 15 but not to escape therefrom.

As shown in Figures 1 to 3, the fly wheel 13 on the face adjacent the housing 14 has connected thereto a pair of centrifugally operable control mechanisms. As each mechanism is identical in structure only one will be specifically described. The mechanism 31 includes a first lever 30 which is pivotally connected intermediate its ends to a fly wheel 13 for free rotation about a horizontal axis or pin 44 projecting from one face of the fly wheel 13. On one end of the lever 30 is a weight 32. A first slip ring 36 is positioned in between the fly wheel 13 and the pump casing 15 and is connected to the other end of the lever 30 for movement of the slip ring 36 away from the fly wheel 13 and toward the pump casing 15 responsive to the free rotational movement of the lever 30. Specifically, the other end of the lever 30 is pivotally connected to one end of a link 34. The other end of the link 34 is pivotally connected to the free end of the short leg 45 of an L-shaped second lever 33, the lever 33 being pivotally connected at the junction of the short leg 45 with its long leg 46 to a bracket 47 carried by the fly wheel 13. The free end of the long leg 46 of the lever 33 is pivotally connected to one end of a link 35 which carries on the other end a first slip ring 36. A second slip ring 37 embracingly receives the first slip ring 36 and the first slip ring 36 is attached to the second ring 37 by means of bolts 38 which extend through the periphery of the slip ring 37 and each having a portion adjacent its free end engaged in a groove 39 provided in the periphery of the slip ring 36, as shown in Figure 8.

As shown in Figure 6, the slip ring 37 is operatively connected to the outlet valve means or valve 41 which is slidable in the outlet valve block 24. Although in Figure 1 only one valve stem 41 is shown, there are two in diametrically opposite positions on the housing 14.

In operation as the drive shaft 12 is rotated by the engine of a vehicle or other source of motor power, the sun gear 23 rotates the planetary gears 22 which are connected to the pump gears 18. The pump gears operate to force liquid out of the outlet ports 23 to recirculate through the space within the housing 14 and back into the inlet port 26 to the pump casing. As the flywheel rotates slowly very little torque is delivered to the driven shaft 11. As the fly wheel 13 increases its speed of rotational movement, the weights 32 move outwardly under the influence of centrifugal force, resulting in limited rotation of the associated levers 30 about the pins 44 as axes in counterclockwise directions, Figure 2, and effect corresponding movement of the levers 33, links 35, and the associated slip rings 36 and 37 away from the fly wheel 13 to shift the valve 41 to the positions closing the passages 24' through the valve block 24. The closing of the passages 24' through the associated valve blocks 24 locks the pump gear 18 and the gear 19. The action of locking these gears stops the planitary gear 22 from rotating and drives the housing 14 at the same speed of the flywheel. This results in the driven shaft 11 being driven at the same speed as the drive shaft 12.

While a single embodiment of the present invention has been here shown and described, other embodiments are contemplated within the scope of the appended claims without departing from the spirit of the invention.

What is claimed is:

1. In a variable speed transmission including a drive shaft, a fly wheel carried by said drive shaft, a planetary gear train connected to said shaft, a housing containing liquid surrounding and connected to said gear train for rotation with the latter, a closed pump casing containing liquid positioned within said housing, a gear pump mechanism within said casing, and normally open centrifugally closable outlet valve means providing only outlet communication between the interior of said casing and the interior of said housing, the improvement consisting of a centrifugally operable control mechanism operatively connected to said outlet valve means, said mechanism comprising a lever positioned adjacent the face of said fly wheel contiguous to said pump casing and pivotally connected intermediate its ends to said fly wheel for free rotation about a horizontal axis, a weight on one end of said lever, a first slip ring positioned between said flywheel and said pump casing and connected to the other end of said lever for movement of said slip ring away from said fly wheel and toward said pump casing responsive to free rotational movement of said lever, and a second slip ring secured to said first ring and operatively connected to said outlet valve means.

2. In a variable speed transmission including a drive shaft, a fly wheel carried by said drive shaft, a planetary gear train connected to said shaft, a housing containing liquid surrounding and connected to said gear train for rotation with the latter, a closed pump casing containing liquid positioned within said housing, a gear pump mechanism within said casing, and normally open centrifugally closable outlet valve means providing only outlet communication between the interior of said casing and the interior of said housing, the improvement consisting of a centrifugally operable control mechanism operatively connected to said outlet valve means, said mechanism comprising a lever positioned adjacent the face of said fly wheel contiguous to said pump casing and pivotally connected intermediate its ends to said fly wheel for free rotation about a horizontal axis, a weight on one end of said lever, a first slip ring positioned between said fly wheel and said pump casing and connected to the other end of said lever for movement of said slip ring away from said fly wheel and toward said pump casing responsive to free rotational movement of said lever, a second slip ring embracing and receiving said first ring and operatively connected to said outlet valve means, and means detachably securing said second slip ring to said first slip ring.

References Cited in the file of this patent
UNITED STATES PATENTS

| | | |
|---|---|---|
| 1,754,953 | Igou | Apr. 15, 1930 |
| 1,906,979 | Gardner | July 17, 1934 |
| 2,079,691 | Joyce | May 11, 1937 |